(12) United States Patent
Nishide

(10) Patent No.: US 9,860,375 B2
(45) Date of Patent: Jan. 2, 2018

(54) CTI SYSTEM AND CTI CONTROL METHOD

(75) Inventor: Nobuo Nishide, Kawasaki (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 1970 days.

(21) Appl. No.: 12/056,953

(22) Filed: Mar. 27, 2008

(65) Prior Publication Data

US 2008/0240402 A1 Oct. 2, 2008

(30) Foreign Application Priority Data

Mar. 29, 2007 (JP) .................................. 2007-086460

(51) Int. Cl.
*H04L 12/28* (2006.01)
*H04M 3/42* (2006.01)
*H04M 7/12* (2006.01)

(52) U.S. Cl.
CPC ...... *H04M 3/42323* (2013.01); *H04M 7/1235* (2013.01); *H04M 2203/1091* (2013.01)

(58) Field of Classification Search
CPC .......... H04M 3/42323; H04M 1/2473; H04M 3/546; H04M 1/72566; H04W 84/16; H04Q 3/0025
USPC .......... 370/352; 455/426.1, 414, 418, 412.2, 455/550.1, 555; 342/450
See application file for complete search history.

(56) References Cited

U.S. PATENT DOCUMENTS

| | | | |
|---|---|---|---|
| 6,223,055 B1 * | 4/2001 | Cyr ................................ | 455/555 |
| 2003/0064711 A1 * | 4/2003 | Gilbert et al. ................. | 455/414 |
| 2003/0228882 A1 * | 12/2003 | Ezumi ......................... | 455/550.1 |
| 2004/0127197 A1 * | 7/2004 | Roskind ............ | H04M 1/72566 455/412.2 |
| 2005/0048967 A1 * | 3/2005 | Hoglander ........... | H04Q 3/0025 455/426.1 |
| 2006/0116121 A1 * | 6/2006 | Rosado ................. | H04M 3/546 455/428 |
| 2006/0205394 A1 * | 9/2006 | Vesterinen .................... | 455/418 |
| 2007/0290923 A1 * | 12/2007 | Norta et al. .................. | 342/450 |

(Continued)

FOREIGN PATENT DOCUMENTS

| JP | 537417 | 2/1993 |
|---|---|---|
| JP | H 08-321873 A | 12/1996 |
| JP | 9162970 | 6/1997 |

(Continued)

OTHER PUBLICATIONS

Communication from the Japanese Patent Office dated Feb. 8, 2012, in a counterpart application citing No. 2007-086460.

*Primary Examiner* — Noel Beharry
*Assistant Examiner* — Lionel Preval
(74) *Attorney, Agent, or Firm* — Sughrue Mion, PLLC

(57) ABSTRACT

In a CTI system, when a wireless terminal is called in response to a transmission request from a personal computer, a key telephone main unit adds to a call signal identification information indicating that a call is based on the transmission request from the personal computer. When the call is received, the wireless terminal judges whether or not the identification information is added to the call signal. When it is judged that the identification information is added, the wireless terminal automatically answers the call. Otherwise, the wireless terminal does not automatically answer. Thus, in case of transmission from a CTI application, operability and convenience are improved.

2 Claims, 3 Drawing Sheets

(56) References Cited

U.S. PATENT DOCUMENTS

2013/0022038 A1\* 1/2013 Cadiz et al. .................. 370/352

FOREIGN PATENT DOCUMENTS

| JP | 2001-326969 A | 11/2001 |
|----|---------------|---------|
| JP | 2005318344    | 11/2005 |

\* cited by examiner

CTI SYSTEM AND CTI CONTROL METHOD

This application is based upon and claims the benefit of priority from Japanese patent application No. 2007-086460, filed on Mar. 29, 2007, the disclosure of which is incorporated herein in its entirety by reference.

BACKGROUND OF THE INVENTION

This invention relates to a CTI (Computer Telephony Integration) system and, in particular, to a CTI system using a wireless terminal as an extension telephone set and to a CTI control method.

In a CTI system, a key telephone main unit accommodating a plurality of extension telephone sets may be network-connected to a plurality of personal computers associated with the extension telephone sets, respectively. In this structure, a processing request related to a particular extension telephone set can be sent to the key telephone main unit from the personal computer associated with the particular extension telephone set. As another CTI system, there is known a system in which a wireless terminal, such as a PHS telephone set, is used as an extension telephone set (see, for example, Japanese Unexamined Patent Application Publication (JP-A) No. 2005-318344).

Further, a telephone set having an automatic answering function is known (see, for example, Japanese Unexamined Patent Application Publication (JP-A) No. H9-162970).

Furthermore, a wireless equipment is known in which a speaker volume in a standby mode and a speaker volume during speaking are automatically controlled (see, for example, Japanese Unexamined Patent Application Publication (JP-A) No. H5-37417).

SUMMARY OF THE INVENTION

In a related CTI system, in case where a transmission request related to a wired extension telephone set is made from a personal computer (CTI application), a key telephone main unit brings the extension telephone set into a hands-free state and, thereafter, calls a destination telephone set.

On the other hand, in case where a transmission request related to a wireless terminal is made from a personal computer, a key telephone main unit first attempts to secure a radio channel between the wireless terminal and a base station connected to the key telephone main unit in order to avoid the following problem. If a radio channel is not secured first, there may arise a situation in which, although a call to a destination telephone set is answered, no speech path can be formed between the wireless terminal and the destination telephone set. This is because the number of radio channels is limited.

In order to secure the radio channel, the key telephone main unit calls the wireless terminal via a wireless base station and the called wireless terminal answers. Thus, the radio channel is secured. In the related CTI system, such answering operation of the wireless terminal is manually carried out.

As described above, in the related CTI system using the wireless terminal, it is required to manually operate the wireless terminal after the transmission request is made from the personal computer. Therefore, the related CTI system is inferior in operability and in convenience.

It is therefore an exemplary object of the present invention to provide a CTI system using a wireless terminal, which is improved in operability and in convenience.

Incidentally, a telephone set which automatically answers an incoming call is known. However, such a telephone set is a wired terminal and is not a wireless terminal.

Further, a wireless equipment in which the sound volume is automatically controlled is known. However, such a wireless equipment is not relevant to the CTI system.

In order to achieve the above-mentioned object, according to an aspect of this invention, there is provided a CTI system comprising a key telephone main unit accommodating an extension line and an external line and connected to a computer network, a wireless terminal used as an extension telephone set and adapted to be wirelessly connected to an antenna connected to the key telephone main unit, and a computer terminal connected to the computer network and associated with the wireless terminal, the key telephone main unit calling the wireless terminal associated with the computer terminal in response to a transmission request from the computer terminal, wherein:

the key telephone main unit comprises a code transmitting part for transmitting, upon calling the wireless terminal in response to the transmission request from the computer terminal, a code indicating that a call is based on the transmission request from the computer terminal and the wireless terminal comprises an automatic answering part for automatically answering the call if the call includes the code.

In the CTI system, the wireless terminal may comprise a sound volume control part for controlling the volume of a receiving sound when the call is automatically answered.

In the CTI system, the sound volume control part has a motion detecting portion for detecting a motion of the wireless terminal so as to change the volume of the receiving sound when the motion of the wireless terminal is detected.

According to another aspect of this invention, there is provided a CTI control method for use in a CTI system comprising a key telephone main unit accommodating an extension line and an external line and connected to a computer network, a wireless terminal used as an extension telephone set and adapted to be wirelessly connected to an antenna connected to the key telephone main unit, and a computer terminal connected to the computer network and associated with the wireless terminal, the key telephone main unit forming a speech path between the wireless terminal associated with the computer terminal and a destination telephone set in response to a transmission request from the computer terminal, wherein:

the key telephone main unit sends, upon calling the wireless terminal in response to the transmission request from the computer terminal, a code indicating that a call is based on the transmission request from the computer terminal, the wireless terminal automatically answering the call in case where the call includes the code.

In the CTI control method, the wireless terminal may increase the volume of a receiving sound to a first predetermined sound volume when the call is automatically answered.

In the CTI control method, the sound volume control part may detect a motion of the wireless terminal to decrease the volume of a receiving sound to a second predetermined sound volume.

According to still another aspect of this invention, there is provided a wireless terminal for use in a CTI system, the wireless terminal comprising:

a judging part for judging whether or not identification information is added to a call signal, and an automatic answering part for automatically answering a call if the judging part detects that the identification information is added to the call signal.

According to a further aspect of this invention, there is provided a key telephone main unit for use in a CTI system, the key telephone main unit comprising:

an identification information adding part for adding identification information to a call signal when a wireless terminal associated with a personal computer is called in response to a transmission request from the personal computer.

According to the present invention, after the transmission request is made from the personal computer (CTI application), it is not necessary to operate the wireless terminal until the destination telephone set answers. In other words, until the destination telephone set answers, the wireless terminal can be left on a telephone holder or a battery charger and need not be held in a user's hand. Thus, user friendliness is improved.

DESCRIPTION OF THE EXEMPLARY EMBODIMENT

Figure 1:
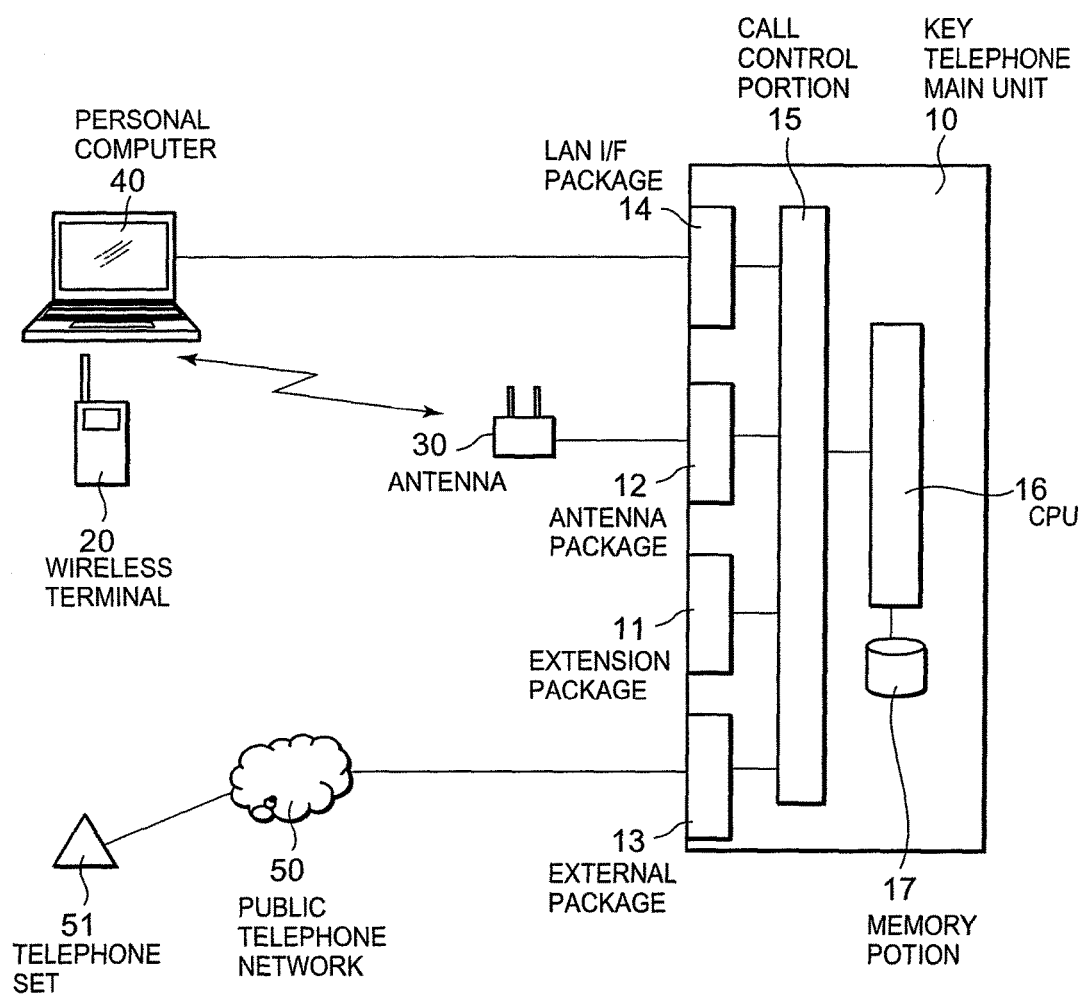
FIG. 1 is a view showing a schematic structure of a CTI system according to an exemplary embodiment of the present invention.

Now, an exemplary embodiment of the present invention will be described with reference to the drawing.

Referring to FIG. 1, the CTI system shown in the figure includes a key telephone main unit 10 accommodating extension lines and external lines, a wireless terminal 20, an antenna 30 required to use the wireless terminal 20 as an extension telephone set, and a personal computer 40 associated with the wireless terminal 20 so as to operate in cooperation with the wireless terminal 20.

The key telephone main unit 10 comprises an extension package 11 for connecting an extension telephone set (not shown), an antenna package 12 for connecting the antenna 30, an external package 13 for connecting a public telephone network 50, a LAN I/F package 14 for connecting a LAN to which the personal computer 40 is connected, a call control portion 15 connected to these packages 11 through 14, a CPU 16 connected to the call control portion 15, and a memory portion 17 connected to the CPU 16.

Under control of the CPU 16, the call control portion 15 controls the extension package 11, the antenna package 12, the external package 13, and the LAN I/F package 14 to control communication between the extension lines and between the extension line and the external line.

By wireless communication with the antenna 30, the wireless terminal 20 functions like an extension telephone set. The wireless terminal 20 is associated with the personal computer 40 in one-to-one correspondence and can make a transmission request, such as call origination, from the personal computer 40. Upon making the transmission request from the personal computer 40, the wireless terminal 20 is often placed at a predetermined position, for example, mounted on a telephone holder or a battery charger. It is noted here that, although only one wireless terminal 20 and only one personal computer 40 are illustrated in the figure, a plurality of wireless terminals and a plurality of personal computers are generally present.

Next, an operation of the CTI system shown in FIG. 1 will be described.

First, the personal computer 40 with a CTI application transmits a transmission command including a telephone number of a destination telephone set to the key telephone main unit 10. It is assumed here that the destination telephone set is a telephone set 51 connected to the public telephone network 50.

Figure 2:
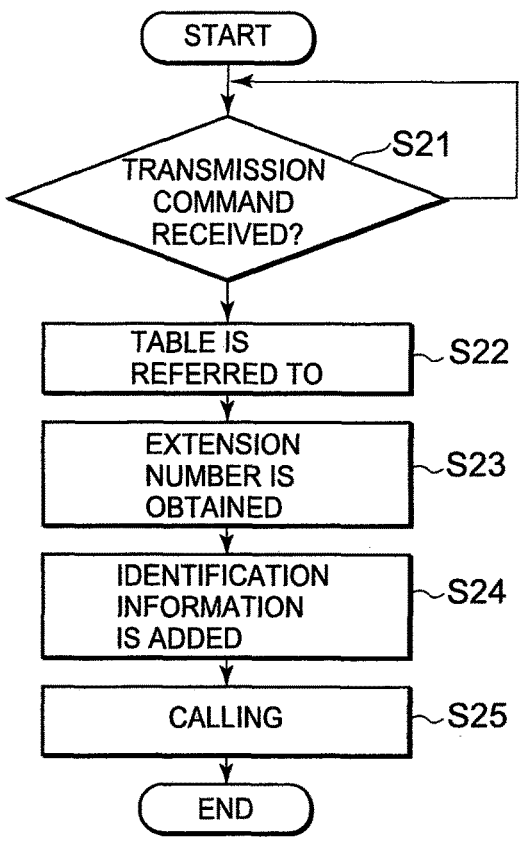
FIG. 2 is a flow chart for describing an operation of a key telephone main unit in the CTI system illustrated in FIG. 1.

The transmission command transmitted from the personal computer 40 is sent to the CPU 16 via the LAN I/F package 14 and the call control portion 15. When the transmission command is received, the CPU 16 operates as shown in FIG. 2.

Specifically, when the transmission command is received (Yes at a step S21), the CPU 16 refers to an association table in the memory portion 17 (step S22). In the association table, information related to association between the personal computer 40 and the wireless terminal 20 is registered. The CPU 16 obtains, from the association table, an extension number of the wireless terminal 20 associated with the personal computer 40 which has transmitted the transmission command (step S23). Then, the CPU 16 generates a call signal with a caller number set to a special number, for example, "9999", as identification information indicating that a call is based on the transmission command from the CTI application (step S24). At this time, the CPU 16 functions as identification information adding means. Then, the CPU 16 calls the wireless terminal 20 by using the call signal generated as mentioned above (step S25).

Figure 3:
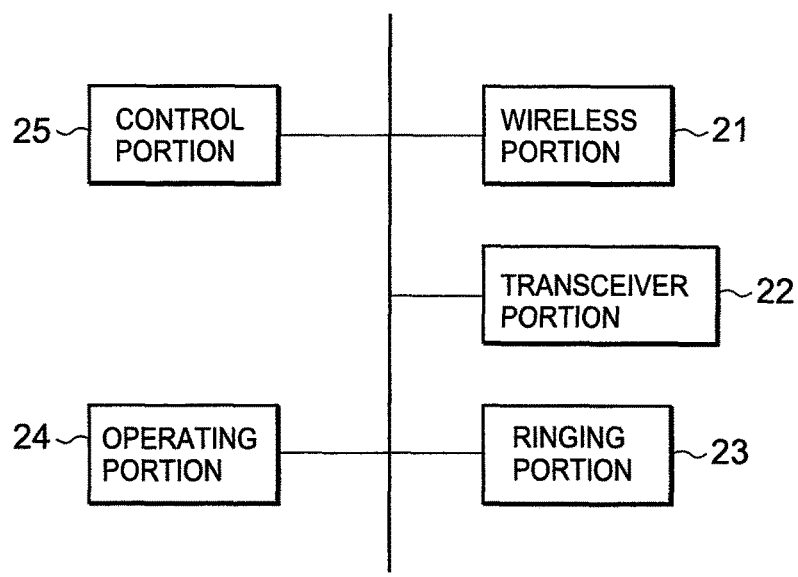
FIG. 3 is a block diagram showing a schematic structure of a wireless terminal in the CTI system illustrated in FIG. 1.

As shown in FIG. 3, the wireless terminal 20 includes a wireless portion 21, a transceiver portion 22, a ringing portion 23, an operating portion 24, and a control portion 25 for controlling these portions 21 through 24.

Figure 4:
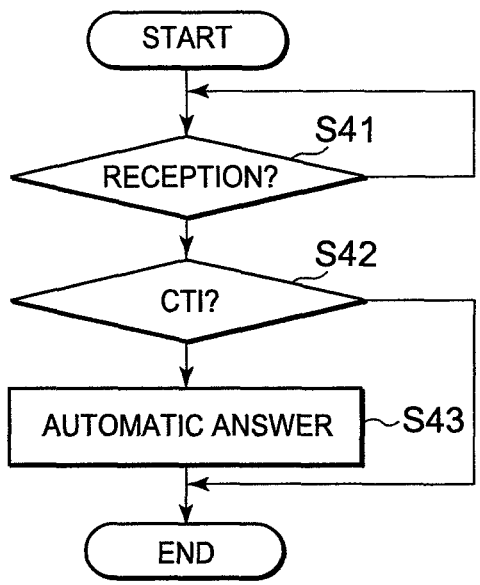
FIG. 4 is a flow chart for describing an automatic answering operation of the wireless terminal in FIG. 3.

When a radio wave transmitted from the antenna 30 is received via the wireless portion 21, the control portion 25 operates as shown in FIG. 4.

Specifically, when a reception signal is received (step S41), the control portion 25 compares a caller number included in the reception signal with identification information preliminarily stored in a memory or the like (step S42). At this time, the control portion 25 functions as judging means.

In case where the caller number included in the reception signal is coincident with the identification information stored in the memory or the like, the control portion 25 judges that the call is based on the transmission command from the CTI application. Then, the control portion 25 controls the wireless portion 21 to automatically return an answering signal (step S43). At this time, the control portion 25 functions as automatic answering means.

In case where the wireless terminal 20 is called from the extension telephone set (not shown) connected to the extension package 11, a caller number included in the call signal is an extension telephone number of the extension telephone set. Therefore, as a result of comparison at the step S42, it is judged that the caller number is not coincident with the identification information. Thus, the wireless terminal 20 does not automatically answer the call. At this time, the control portion 25 carries out a normal receiving operation, for example, makes the ringing portion 23 generate a ringing tone to inform reception of the call.

Figure 5:
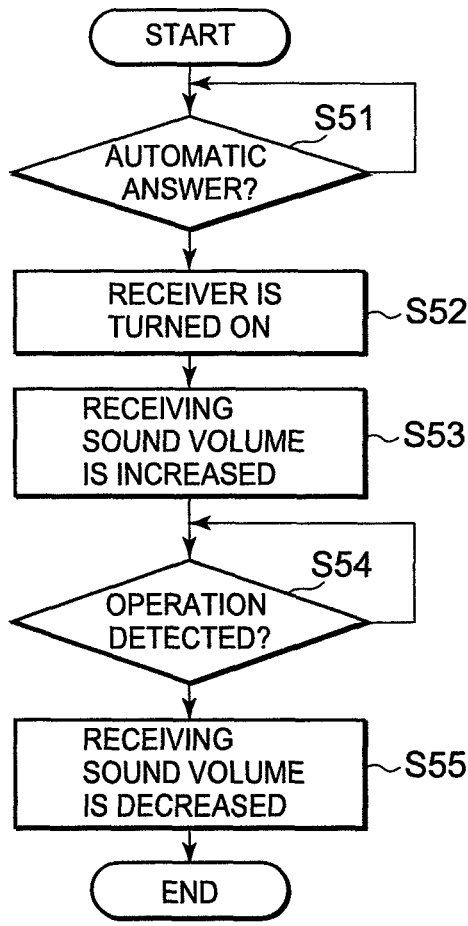
FIG. 5 is a flow chart for describing a sound volume control operation of the wireless terminal in FIG. 3.

In case where the call is automatically answered, the control portion 25 controls a sound volume of a receiver as shown in FIG. 5.

Specifically, after the call is automatically answered (Yes at a step S51), the control portion 25 controls the transceiver portion 22 to bring the receiver into an on state (hands-free state) (step S52). Further, the control portion 25 sets the sound volume of the receiver to a level greater than a normal sound volume (step S53). Thus, without operating the wireless terminal 20 and even in a place away from the wireless terminal 20, an operator of the personal computer 40 can hear a calling tone generated from the receiver of the wireless terminal 20 and a voice of the other party when the destination telephone set answers.

Further, in case where any key (for example, an answering button) of the operating portion 24 of the wireless terminal 20 is pressed down, the control portion 25 detects such operation (step S54) to return the sound volume of the receiver to the normal sound volume. Thus, the control portion 25 functions as sound volume control means also.

When the answering signal from the wireless terminal 20 is received via the antenna 30, the antenna package 12, and the call control portion 15, the CPU 16 of the key telephone main unit 10 instructs the call control portion 15 to call the telephone number of the destination telephone set 51, which is included in the transmission command from the personal computer 40.

The call control portion 15 calls via the external package 13 the destination telephone set 51 connected to the public telephone network 50. The destination telephone set 51 generates a ringing tone in response to a reception signal from the public telephone network 50. At this time, the wireless terminal 20 already answers the call as described above. Therefore, the operator of the personal computer 40 can hear the calling tone via the wireless terminal 20.

When the destination telephone set 51 answers the call, an answering signal is sent to the CPU 16 via the public telephone network 50, the external package 13, and the call control portion 15. When the answering signal from the destination telephone set 51 is detected, the CPU 16 forms a wireless path between the destination telephone set 51 and the wireless terminal 20 via the public telephone network 50, the external package 13, the call control portion 15, the antenna package 12, and the antenna 30. Thus, it is possible to perform communication between the wireless terminal 20 and the destination telephone set 51.

As described in the foregoing, in the CTI system according to the present embodiment, the wireless terminal is called by using an identification signal indicating that the call is transmitted from the CTI application. Then, the wireless terminal judges whether or not the call is transmitted from the CTI application. In case where the call is transmitted from the CTI application, the wireless terminal automatically answers. Therefore, convenience and operability of the CTI system can be improved.

In the above-described embodiment, a caller number is set to a special number so as to identify whether or not the call is transmitted from the CTI application. Without being limited thereto, other identification information may be added. For example, a calling party subaddress to be added to the caller number may be used. Alternatively, a predetermined specific bit of a setup signal upon transmission may be turned on.

Further, in the above-described embodiment, the sound volume is returned to the normal sound volume when an operation of the operating portion 24 is detected. Alternatively, a motion detecting portion, such as an acceleration sensor, for detecting a motion of the wireless terminal 20 may be provided so that the sound volume is changed when the wireless terminal 20 is picked up. Furthermore, in case where the wireless terminal 20 is mounted on a battery charger, the sound volume may be changed in response to a signal indicating release of electric connection with the battery charger (termination of battery charging).

While the invention has been particularly shown and described with reference to an exemplary embodiment thereof, the invention is not limited to these embodiments. It will be understood by those of ordinary skill in the art that various changes in form and details may be made therein without departing from the sprit and scope of this invention as defined by the claims.

What is claimed is:

1. A Computer Telephony Integration (CTI) system comprising a key telephone main unit accommodating an extension line and an external line and connected to a computer network, an antenna connected to the key telephone main unit, a wireless terminal used as an extension telephone set and configured to be wirelessly connected to the antenna so that the key telephone main unit exchanges directly with the wireless terminal, and a computer terminal connected to the computer network and associated with the wireless terminal, the key telephone main unit calling the wireless terminal associated with the computer terminal in response to a transmission request from the computer terminal, wherein:

the key telephone main unit comprises an identification information adding part for adding, upon calling the wireless terminal in response to the transmission request from the computer terminal, to a call signal identification information indicating that a call is based on the transmission request from the computer terminal;

the wireless terminal comprises a judging part for judging whether or not the identification information is added to the call signal and an automatic answering part for automatically answering the call if the identification information is added to the call signal, said automatic answering part does not automatically answer the call if the identification information is not added to the call signal;

the wireless terminal comprises a sound volume control part for increasing a volume of a receiving sound to a first predetermined sound volume when the call is automatically answered; and the sound volume control part comprises a motion detecting portion for detecting a motion of the wireless terminal so as to decrease the volume of the receiving sound to a second predetermined sound volume when the motion of the wireless terminal is detected.

2. A Computer Telephony Integration (CTI) control method for use in a CTI system comprising a key telephone main unit accommodating an extension line and an external line and connected to a computer network, an antenna connected to the key telephone main unit, a wireless terminal used as an extension telephone set and configured to be wirelessly connected to the antenna so that the key telephone main unit exchanges directly with the wireless terminal, and a computer terminal connected to the computer network and associated with the wireless terminal, the key telephone main unit forming a speech path between the wireless terminal associated with the computer terminal and a destination telephone set in response to a transmission request from the computer terminal, wherein:

the key telephone main unit sends, upon calling the wireless terminal in response to the transmission request from the computer terminal, a code indicating that a call is based on the transmission request from the computer terminal, the wireless terminal automatically answers the call in case where the call includes the code, the wireless terminal does not automatically answer the call in case where the call does not include the code;

the wireless terminal increases a volume of a receiving sound to a first predetermined sound volume when the call is automatically answered; and when the wireless terminal detects a motion of itself, the wireless terminal decreases the volume of a receiving sound to a second predetermined sound volume.

* * * * *